United States Patent [19]

Grappelli et al.

[11] Patent Number: 4,552,726
[45] Date of Patent: Nov. 12, 1985

[54] PLANT CONSISTING OF MODULAR ELEMENTS FOR DEGRADING ORGANIC WASTES BY MEANS OF EARTH WORMS

[75] Inventors: Adriana Grappelli; Umberto Tomati, both of Rome; Grazio Palma, Mentana, all of Italy

[73] Assignee: Consiglio Nazionale Delle Ricerche, Rome, Italy

[21] Appl. No.: 621,287

[22] Filed: Jun. 15, 1984

[30] Foreign Application Priority Data

Jun. 17, 1983 [IT] Italy .................. 48526 A/83

[51] Int. Cl.⁴ .................. C05F 9/02; B65G 1/04; B65G 37/00
[52] U.S. Cl. .................. 422/184; 198/569; 198/601; 414/268; 71/9; 71/13; 71/21; 210/153; 210/198.1
[58] Field of Search .................. 210/198.1, 153; 198/548, 558, 569, 601; 71/9, 13, 21; 422/184, 232, 233; 414/266, 267, 268, 269, 271

[56] References Cited

U.S. PATENT DOCUMENTS

| 259,387 | 6/1882 | Harrison | 414/268 |
|---|---|---|---|
| 1,726,603 | 9/1929 | Allen | 414/269 |
| 2,703,749 | 3/1955 | Herndon | 422/233 |
| 2,856,083 | 10/1958 | Corrigan | 414/271 |
| 3,010,802 | 11/1961 | Schenk | 422/232 |
| 3,146,071 | 8/1964 | Pierson | 422/233 |
| 3,314,557 | 4/1967 | Sackett | 414/269 |
| 3,372,018 | 3/1968 | Stocker | 71/21 |
| 3,404,963 | 10/1968 | Fritsche | 414/267 |
| 3,463,332 | 8/1969 | Quadrel | 414/268 |
| 3,734,988 | 5/1973 | Aintablian | 71/9 |
| 4,108,625 | 8/1978 | Okada | 71/9 |
| 4,347,632 | 9/1982 | Criss | 71/9 |
| 4,385,859 | 5/1983 | Goosens | 414/268 |

FOREIGN PATENT DOCUMENTS 2917048 11/1980 Fed. Rep. of Germany ...... 422/184

*Primary Examiner*—Ernest G. Therkorn
*Attorney, Agent, or Firm*—Pollock, Vande Sande & Priddy

[57] ABSTRACT

A plant consisting of modular elements for reducing organic wastes by degrading them by means of earth worms, comprising a tank for organic wastes, arranged outside the plant assembly, an inclined main screw feeder for lifting the materials onto work stations and discharging them onto horizontal screw-feeders arranged at any work station, the horizontal feeders conveying the materials to horizontal conveyers which discharge them into modular containers arranged on the work stations, whereby, at the end of the transformation, the material is discharged through hoppers onto conveyors arranged at the plant base and conveyed to storage containers.

5 Claims, 6 Drawing Figures

PLANT CONSISTING OF MODULAR ELEMENTS FOR DEGRADING ORGANIC WASTES BY MEANS OF EARTH WORMS

FIELD OF THE INVENTION

The present invention relates to a plant for reducing organic wastes by degradation by means of earth worms, said plant being composed of independent modular elements and comprising, in combination, a container for materials, screw feeders and hoppers.

BACKGROUND OF THE INVENTION

The reduction of the organic wastes is one of the most critical problems which arises in technologically advanced countries and has been faced in several ways, broadly involving either utilization or distruction of the organic wastes. In recent years, particularly in the United States, the interest of some industries and municipalized concerns has been devoted to the possibility of reducing organic wastes through transformation by the action of the earth-worms.

The action of the earth worms reduces the volume of the organic wastes to a remarkable extent, and may be considered as a substantial means for reducing pollution. The earth worms transform the organic wastes into an excellent odorless fertilizer. Moreover, the production of the earth worms may be considered as a source of protein having nutritional value for animal feed.

The reduction of the organic wastes by means of earth worms is due to the fact that the earth worm and the microflora of its digestive apparatus degrade any organic material through decomposition and remarkably reduce its volume.

Under the same ambient conditions, the degradation rate is a function of the physico-mechanical characteristics of the ambient, which should assure good aeration, of the ratio C/N, optimal from 15 to 35, and, obviously, of the quantity of the earth worms. As a result, a material is obtained which, after drying in the air, is odorless and has a granular consistency.

This material, formed by the dejecta of the earth worms, has the characteristics of a good organic fertilizer. Under optimal conditions, an earth worm degrades par day a quantity of organic substance corresponding to its own weight. It has been demonstrated that the best conditions for increasing the degradation rate are attained when the ratio between the mass of the earth worms and that of the organic material is 1:10. This presents the possibility of utilizing the earth worms for reducing solid urban wastes and cleaner muds.

The applicants have carried out several tests with mixtures of about 50% aerobic or anaerobic muds, and about 50% of solid urban wastes; the mean values of the composition thereof are indicated in the following Table 1.

TABLE 1

Composition of the aerobic muds, anaerobic muds and solid urban wastes (mean values)

|  | S.S. (%) | C | O.M. | Ntot | Ptot | K20 |
|---|---|---|---|---|---|---|
| Aerobic mud | 1.90 | 31.05 | 57.09 | 4.20 | 3.00 | 0.90 |
| Anaerobic mud | 3.80 | 41.05 | 52.25 | 2.50 | 1.50 | 0.80 |
| Solid urban wastes | 45.50 | 34.35 | 58.12 | 1.77 | 0.75 | 1.02 |

The earth worms Lumbricus rubellus have been used in a ratio of 40.000 of worms to $1n^3$ of organic material.

It has been observed that after 100 days all the organic material has been completely digested by the earth worms.

No negative effects on the earth worms have been noted in the tests performed on anaerobic muds. A remarkable reduction of the material volume of about 40–60% has been observed. At the end of the tests the earth worms have been separated and an increase of 300% of their weight has been noted.

The degradation of the organic wastes depends on both the ratio C/N of the material, the optimal ratio ranging from 15 to 35, and oxygen quantity present in the wastes.

The product obtained from the degradation of the organic wastes by means of the earth worms has the characteristics of a good fertilizer.

Analysis of this fertilizer reveals a remarkable quantity of nutritious elements, which are mineralizable and directly assimilable, a relevant microbic content and the presence of biologically active metabolits, particularly gibberelins, cytokinins and auxins.

On the basic of the test results it may be affirmed that the use of the earth worms for the degradation is a very economical manner for degrading any kind of organic material, particularly urban wastes and cleaner muds.

For carrying out the tests under existing conditions, the invention provides a plant consisting of modular elements which has the purpose of achieving optimal reduction of organic wastes by degradation by means of earth worms, said plant being apt to be utilized with optimal economic yield and having a power variable as a function of the contingent necessities.

SUMMARY OF THE INVENTION

The plant according to the present invention is built of independent modular elements which may be connected with one another so as to render more functional the use of the entire assembly in a particularly elastic manner so as to adjust its operation to various conditions as occasion shall require.

The elements include containers assuring optimal conditions for both the growth of the earth worms and subsequent reduction of the organic wastes. Each container may contain about 100,000 earth worms which assure daily reduction of about 50 kg of muds with production of 15–20 kg of humus.

Said elements are joined to one another in a number of four superposed elements so as to form modular units which may be joined in dependance on the desired power of the plant built from said modular units.

BRIEF DESCRIPTION OF THE DRAWINGS

The plant in the embodiment which will be disclosed hereafter, consists of 20 units. Since each unit comprises four superposed elements, there are formed four work stations at different levels as shown in the enclosed drawings, in which:

FIG. 6 shows some working steps taking place within the containers for obtaining a product as desired according to the invention.

DESCRIPTION OF PREFERRED EMBODIMENT

Figure 1:
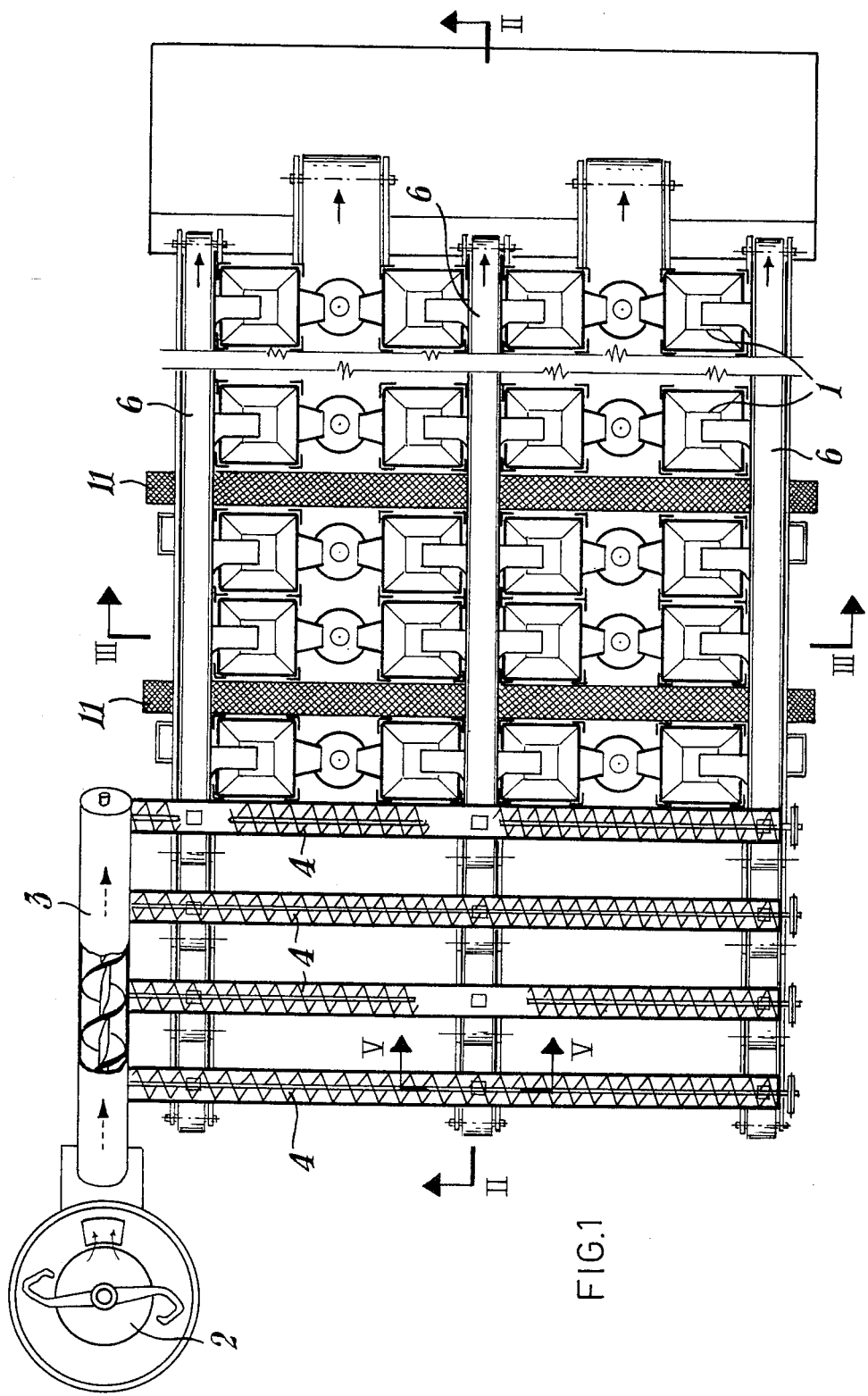
FIG. 1 is a plan view of the plant showing the arrangement of its units.
Figure 2:
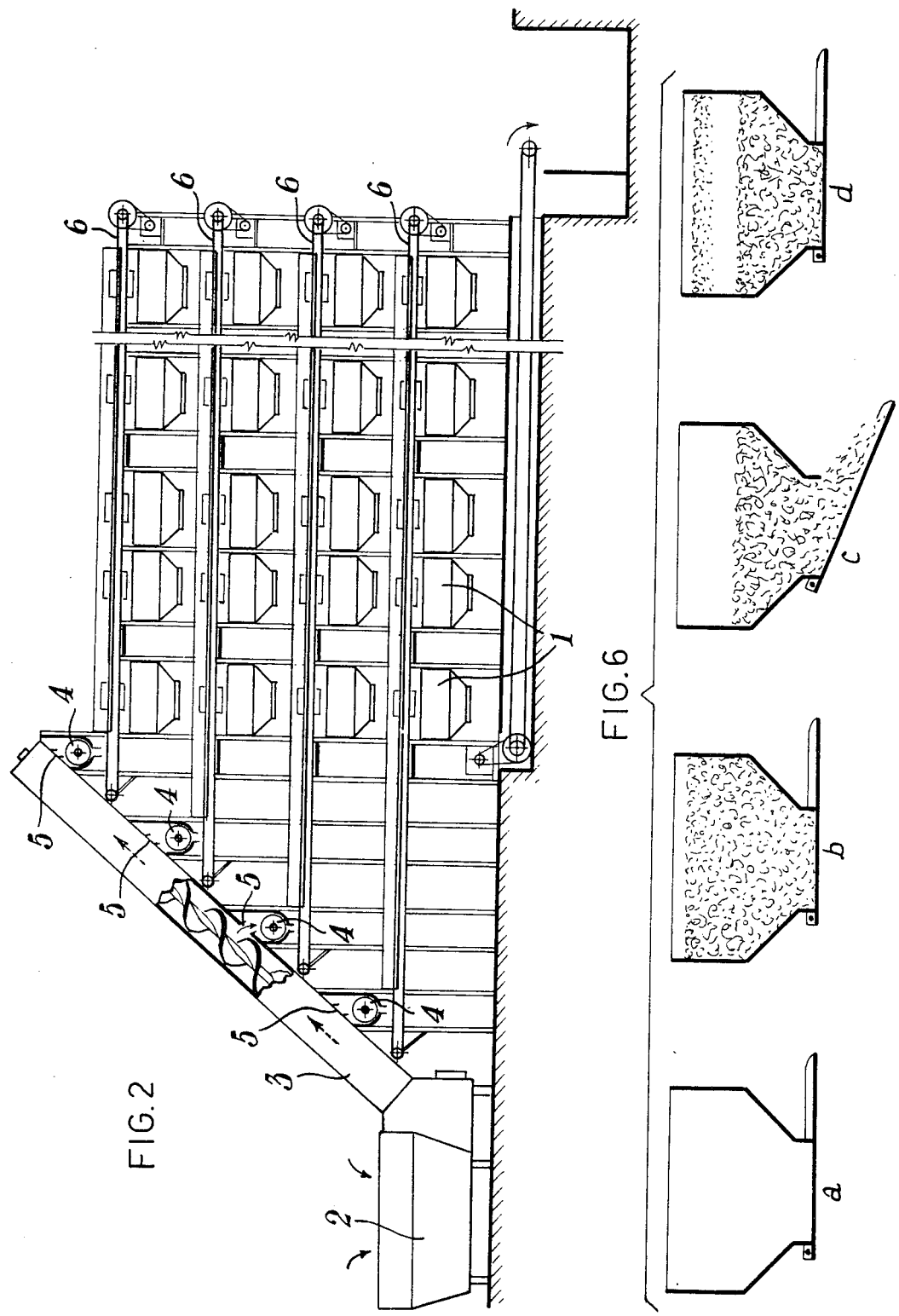
FIG. 2 is a sectional view along the line II—II of FIG 1.
Figure 3:
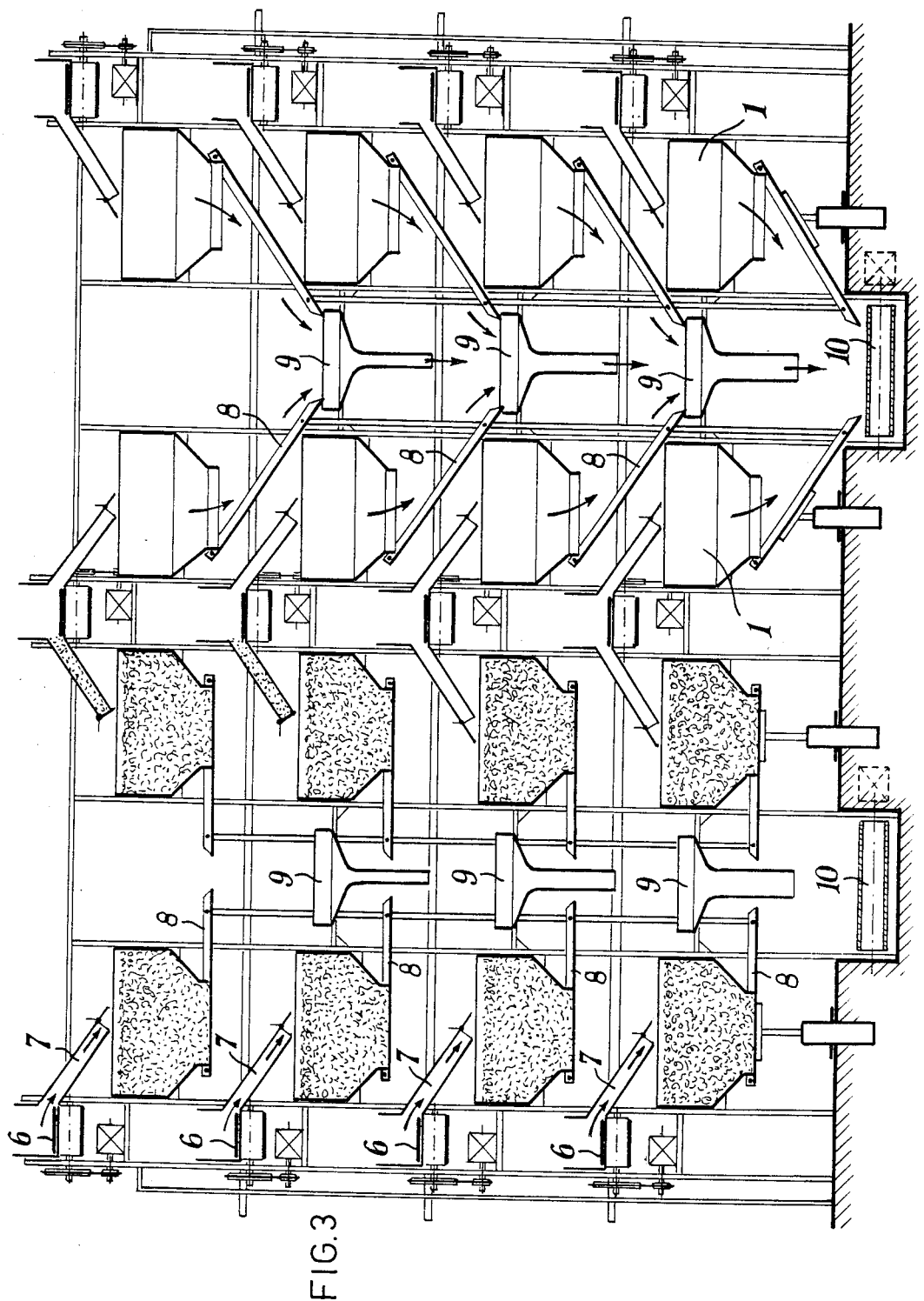
FIG. 3 is a sectional view along the line III—III of FIG. 1.

Referring now to FIGS. 1 to 3, the reference numeral 1 indicates working containers for materials to be reduced by degradation by means of the earth worms. The material contained within a tank 2 is conveyed by an inclined main screw feeder 3 and lifted to work stations, at which it is discharged onto horizontal screw feeders 4, one for each station, through output openings.

Said screw feeders 4 convey the material to belt conveyors 6, which are arranged in sets of three for each work station. The material is conveyed by said belt conveyers 6 to containers 1 and discharged thereinto through metering devices 7. An opening assembly 8 is arranged at the bottom of the container 1 and this assembly 8 also has the function of discharging the degraded material into hoppers 9, from which the material falls down onto belt conveyors 10 and is conveyed to storage chambers. Two gangways 11 are arranged at each work station for overseeing the plant elements.

Figure 4:
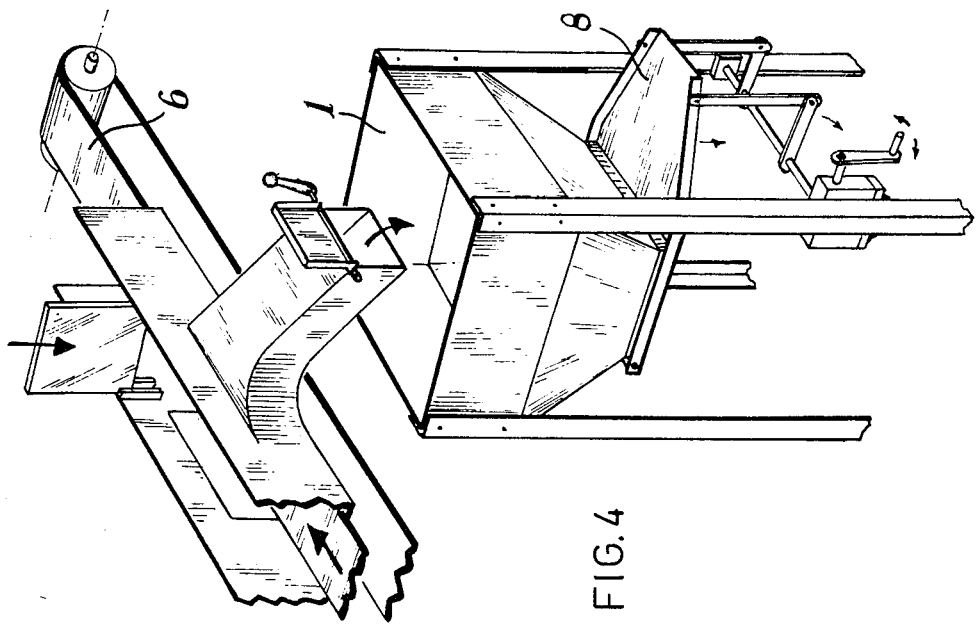
FIG. 4 shows a detail of device for discharging the material from belt conveyers into a container, with a hand-operated discharge device.

FIG. 4 shows a detail of the devices for discharging the material from the belt conveyors 6 into the containers 1 and for discharging said material from said containers.

Figure 5:
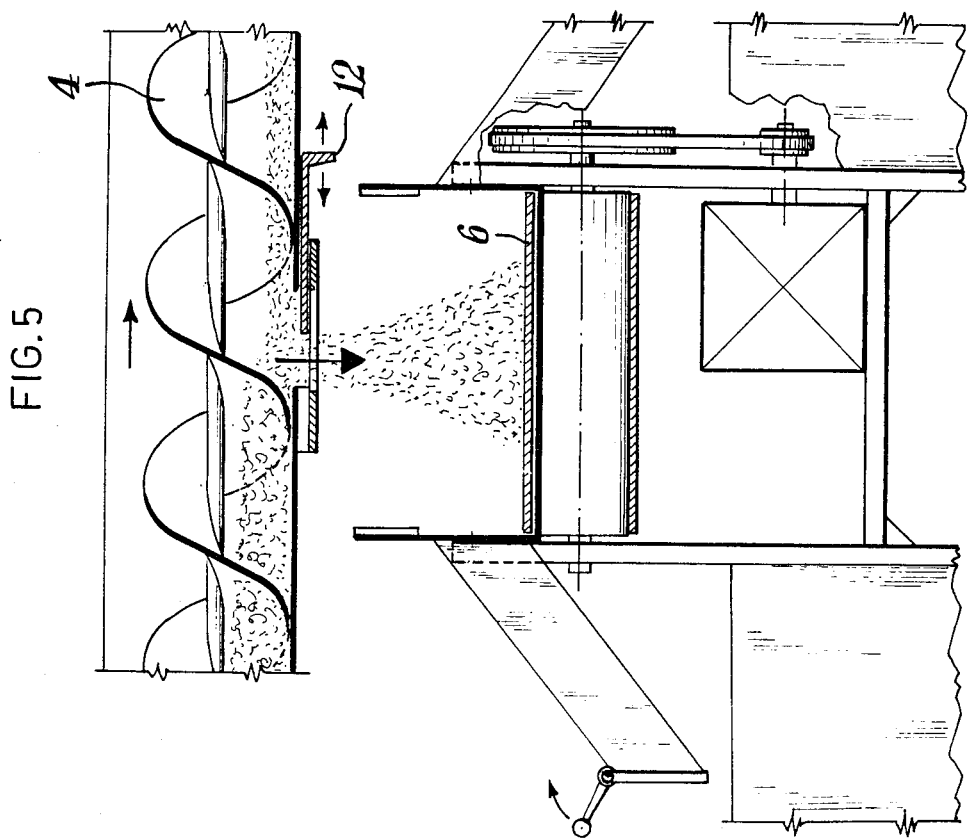
FIG. 5 shows a sectional view along the line V—V of FIG. 1 a detail of a horizontal screw feeder on the respective belt conveyer.

FIG. 5 shows the discharge operation of the material from the screw feeder 4 onto the belt conveyer 6, by means of a manual discharge device 12.

FIG. 6 shows steps in the operation performed in the plant for obtaining the product transformed by the degradation by means of the earth worms.

FIG. 6a shows an empty container; FIG. 6b shows a container filled with the material to be degraded to which the earth worms have been added in the above indicated ratio; FIG. 6c shows the step of opening the container bottom for discharging the degraded material at the end of the biotransformation; and FIG. 6d shows the subsequent step of closing the container bottom and filling it with new material. It should be noted that in the step shown in FIG. 6c, the degraded material is quickly discharged from the container, whereas the starting material adheres to the container walls.

We claim:

1. A modular element plant for degrading organic wastes by means of earth worms, comprising, in combination
   (a) a tank for organic wastes;
   (b) a plurality of working containers symmetrically distributed in a plurality of container layers, each having at least one pair of container rows;
   (c) a first horizontal conveying means for each container layer;
   (d) two second horizontal conveying means for each pair of container rows, arranged beneath said first horizontal conveying means perpendicularly thereto;
   (e) an inclined conveying means connecting said tank with one end of said first horizontal conveying means;
   (f) output openings provided in said first horizontal conveying means to discharge organic wastes, received from said inclined conveying means, onto said second horizontal conveying means;
   (g) a pluraltiy of chute means on said second conveying means for charging said organic wastes into the containers of each container row;
   (h) a plurality of hopper means each arranged between two containers of adjacent container rows of a said pair of rows, except for the containers of the uppermost and lowest layers;
   (i) opening means at the bottom of each working container for discharging the degraded material into said hopper means;
   (j) a third horizontal conveying means arranged beneath said hopper means, whereby said hopper means and the container of the lowest container layer discharge the degraded material onto said third conveying means to convey it into storage chambers.

2. A modular element plant as claimed in claim 1, wherein said inclined conveying means comprises a screw conveyor having discharge mouths for discharging the organic wastes onto the ends of said first horizontal conveying means.

3. A modular element plant as claimed in claim 1, wherein said first horizontal conveying means comprise screw conveyors.

4. A modular element plant as claimed in claim 1, wherein said second and third conveying means comprise belt conveyors.

5. A modular element plant as claimed in claim 1, wherein said opening means on the bottom of each working container of each container row pair are operatively connected with one another to simultaneously open and close said container bottom.

* * * * *